United States Patent [19]

Bass

[11] 4,446,770

[45] * May 8, 1984

[54] DIGITAL TONE GENERATION SYSTEM UTILIZING FIXED DURATION TIME FUNCTIONS

[75] Inventor: Steven C. Bass, Stockwell, Ind.

[73] Assignee: Kimball International, Inc., Jasper, Ind.

[ * ] Notice: The portion of the term of this patent subsequent to Sep. 28, 1999 has been disclaimed.

[21] Appl. No.: 412,258

[22] Filed: Aug. 27, 1982

Related U.S. Application Data

[63] Continuation of Ser. No. 190,631, Sep. 25, 1980, Pat. No. 4,351,219.

[51] Int. Cl.³ .......................... G01H 1/057; G01H 1/06

[52] U.S. Cl. .......................... 84/1.01; 84/1.19; 84/DIG. 9; 84/DIG. 10

[58] Field of Search .............. 84/1.01, 1.03, 1.11-1.13, 84/1.19-1.27, DIG. 9, DIG. 10

[56] References Cited

U.S. PATENT DOCUMENTS

| | | | |
|---|---|---|---|
| 3,515,792 | 6/1970 | Deutsch | 84/1.03 |
| 3,639,913 | 2/1972 | Watson | 84/1.01 X |
| 3,668,294 | 6/1972 | Kameoka et al. | 84/1.01 |
| 3,763,364 | 10/1973 | Deutsch et al. | 84/1.03 X |
| 3,809,786 | 5/1974 | Deutsch | 84/1.01 |
| 3,809,788 | 5/1974 | Deutsch | 84/1.01 |
| 3,809,789 | 5/1974 | Deutsch | 84/1.01 |
| 3,894,463 | 7/1975 | Rocheleau | 84/1.01 |
| 3,908,504 | 9/1975 | Deutsch | 84/1.19 |
| 3,913,442 | 10/1975 | Deutsch | 84/1.19 |
| 3,956,960 | 5/1976 | Deutsch | 84/1.19 |
| 4,085,644 | 4/1978 | Deutsch et al. | 84/1.01 |
| 4,108,036 | 8/1978 | Slaymaker | 84/1.01 |
| 4,130,043 | 12/1978 | Niimi | 84/1.03 |
| 4,150,600 | 4/1979 | Deutsch | 84/1.11 |
| 4,176,577 | 12/1979 | Yamada et al. | 84/1.01 |
| 4,205,574 | 6/1980 | Hoskinson et al. | 84/1.01 |
| 4,265,157 | 5/1981 | Fricke et al. | 84/1.19 |
| 4,282,790 | 8/1981 | Wachi | 84/1.21 |

OTHER PUBLICATIONS

Harold G. Alles, "Music Synthesis Using Real Time Digital Techniques," Apr. 1980 *Proceedings of the IEEE,* vol. 68, pp. 436-449.

Fredric J. Harris, "On the Use of Windows For Harmonic Analysis with Discrete Fourier Transform," Jan. 1978, *Proceedings of the IEEE,* vol. 66, No. 1, pp. 51-83.

*Primary Examiner*—Stanley J. Witkowski

*Attorney, Agent, or Firm*—Jeffers, Irish & Hoffman

[57] ABSTRACT

A tone generation system intended primarily for use in electronic musical instruments wherein a digital representation of a harmonically rich waveform is sampled, and a musical tone is produced therefrom. The stored waveform could be the four term Blackman-Harris window function, which has negligible side lobes and thus greatly attenuated higher harmonics. The stored function is read out at a fixed rate, but the time periods between successive readings of the waveform are varied to thereby vary the frequency of the output signal.

16 Claims, 8 Drawing Figures

DIGITAL TONE GENERATION SYSTEM UTILIZING FIXED DURATION TIME FUNCTIONS

This is a continuation of application Ser. No. 190,631, filed Sept. 25, 1980 now U.S. Pat. No. 4,351,219.

The present invention relates to a digital tone generation system, and in particular to such a system utilized in electronic musical instruments, such as electronic organs.

Within the field of real-time electronic musical tone generation, digital synthesizers and electronic organs have been employed. Synthesizers typically utilize highly complex mathematical algorithms, and with the exception of a small number of research oriented instruments, are capable of the simultaneous sounding of only a very small number of distinct voices. When played by a skilled keyboard musician who may depress as many as twelve keys at any one time, these instruments have proven to be deficient in fulfilling the full artistic desires of the performer. Synthesizers often utilize additive or frequency modulation synthesis techniques.

Electronic organs have become extremely popular for home use within the last fifteen years. Even the more modest electronic organ has the capability of producing many various voices, many of which may be simultaneously selected, so that, historically, numerous variations of subtractive synthesis have been used. The first step in subtractive synthesis is the generation of a harmonically rich waveform of a desired fundamental frequency. The waveform is then processed by frequency division circuitry to provide the various footages which are desired, for example, the 2′, 4′, 8′ and 16′ versions of the fundamental note. A commonly used waveform is the square wave, which is very rich in odd harmonics.

The last of subtractive synthesis is usually preceded by a weighted mixing of the various footages of a fundamental frequency in order to obtain the desired spectral overtone pattern. This last step often includes a summing of all notes currently being generated for the purpose of applying common filtering for formant emphasis. Since the filtering normally does not introduce new harmonics to the tonal mixture, but only emphasizes some frequency bands at the expense of others, it is this filtering action which gives subtractive synthesis its name.

As mentioned above, square waves will have often been utilized in electronic organs because of their rich overtone content. When square waves are utilized in discrete-time implementations, such as in digital tone generation, the problem of aliasing renders square waves virtually useless. In discrete-time implementations, a stored waveform is sampled in a repetitive fashion to produce the output tone. As is known, however, the fundamental and all harmonics produce mirrored tones on both sides of the Nyquist frequency, which is one-half the sampling rate. In the case where the upper harmonics of the waveform are relatively high in amplitude, these folded overtones fall back within the spectral range of human hearing and appear as noise or other objectionable sounds. In order to suppress objectionable aliasing causing the folded overtones to fall back within the range of human hearing, a very high sampling rate, such as a rate of one megahertz, is necessary. If it is desired to produce a plurality of tones simultaneously from a single stored waveform, however, this increases the required digital processing rate to the point where it is not economically feasible at the present time.

Thus, if the economical and powerful subtractive synthesis technique is to be used in digital tone generation systems, a digital oscillator signal must be specified that is not only harmonically rich, but which can always be guaranteed to possess negligibly small aliased overtones regardless of the fundamental frequency desired. These waveforms must be rich in the sense that their audible overtone structure always extends across the entire spectral range of human hearing, again regardless of fundamental frequency. For example, a fundamental note of 40 Hz., has in excess of a hundred times the number of audible overtones as that possessed by a five kilohertz fundamental note, yet the five kilohertz note must still be incapable of causing audible aliasing when an economical sampling rate is used.

Heretofore, it has been difficult to generate harmonically rich waveforms that are properly bandlimited. In accordance with the present invention, however, such harmonically rich wave-forms can be produced without the problem of aliasing within the audible range of human hearing. This is accomplished by storing in a memory a digital representation of the four term Blackman-Harris window function, and reading out of the memory this function at a fixed rate. The frequency of the resultant tone is varied by varying the time durations of zero-signal intervals placed between successive waveforms.

The window function signal utilized in accordance with the present invention will now be described. Let w(t) be a continuous-time signal with a duration $T_w$, and whose values is zero outside the interval $|t| \leqq T_w/2$. Let $W(j\omega)$ represent its Fourier transform. Given a prescribed fundamental frequency, $\omega_o$, we may form the periodic signal $$W_p(t) \overset{\Delta}{=} \sum_{n=-\infty}^{\infty} w\left(t - n\frac{2\pi}{\omega_o}\right)$$

whose transform is in turn given by $$W_p(j\omega) = \omega_o \sum_{n=-\infty}^{\infty} W(jn\omega_o)\delta(\omega - n\,\omega_o),$$

an impulse train enveloped by the spectrum of w(t). Note that as $\omega_o$ is changed, the impulse train spacing interval $\omega_o$ also changes. However the multiplicative envelope is unaffected.

In anticipation of the aliasing problem that arises when passing into discrete-time, it is proposed to use a window function for the continuous-time signal w(t). It has been discovered that the four-term Blackman-Harris window function can be used to great advantage as the harmonic-rich waveform for subtractive synthesis. Although this function is known, it has not heretofore been utilized for tone generation as proposed by the present invention.

Figure 7:
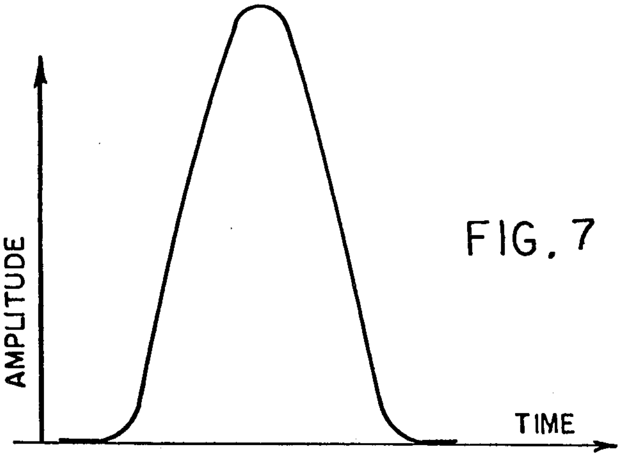
FIG. 7 is a plot of one cycle of the window function.

The four-term Blackman-Harris window function (FIG. 7) is as follows:

$$w(t) = \begin{cases} 0, \ |t| > T_w/2 \\ 0.35875 + 0.48829 \cos(2\pi t/T_w) \\ + 0.14128 \cos(4\pi t/T_w) \\ + 0.01168 \cos(6\pi t/T_w), \ |t| \leqq t_w/2 \end{cases}$$

The spectrum of this window function consists of a centerlobe, between $\omega=\pm 8\pi/T_w$, and sidelobes (of decaying amplitude) the first of which exhibits a peak that is 92 dB. below the center lobe extremum (at $\omega=0$). If w(t) were instead a rectangular pulse of the same duration, the centerlobe width would be only $4\pi/T_w$, but the peak sidelobe value would lie just 14 dB below the centerlobe peak.

The fact that the peak side lobes of a rectangular pulse are attenuated to such a small degree causes the aliasing problems referred to earlier. Because the harmonics folded back into the audible spectrum are not greatly attenuated, they will be quite noticeable, and since they often are not harmonically related to the fundamental (because they are reflected off the arbitrarily chosen Nyquist frequency), they can produce an extremely unpleasant sound.

If $T_w$, the time duration of the window function signal w(t), is chosen such that W)Jω) has a centerlobe zero crossing at the Nyquist frequency $f_s/2$, then, as derived from the above discussion, there is apparently needed $8\pi/T_w=\pi f_s$, or $T_w=8/f_s=8T$, where T is the discrete-time sampling period. Thus, to produce a single cycle of $w_p(t)$ of period $T_o \lessgtr 2\pi/\omega_o$, a digital oscillator must produce eight samples of w(t) followed by $(T_o 8T)/T$ zero samples. If this latter quantity is not an integer, then the second set of eight w(nT) samples will be shifted in phase with respect to the first set. If $T_o<8T$, then the second w(nT) pulse will begin prior to the termination of the first. The hardware implications of this case will be discussed later.

The four-term Blackman-Harris window w(t) can thus be arranged to have a centerlobe edge which coincides with the Nyquist frequency. The spectrum of a $w_p(t)$, which is a periodic waveform formed from w(t) will be an impulse train enveloped by this $\omega_0$-independent window spectrum. Thus, all harmonic components of the fundamental $\omega_o$ occurring at frequencies below the Nyquist will fall within the envelope centerlobe. Therefore, only the harmonics approaching $f_s/2$ in frequency will suffer significant attenuation. However, those harmonics appearing at a frequency high enough to exceed the Nyquist will be enveloped by the window spectrum sidelobes, and these are at least 92 dB down with respect to the centerlobe peak. Thus, when a sampled version of $w_p(t)$ is generated, audible aliasing will not be a problem.

As noted above, the standard continuous-time approach to the generation of harmonically-rich tone signals is to produce a square wave or pulse train with the desired $\omega_o$. As $\omega_o$ is varied, the width (in time) of the rectangular pulse varies also, since generally a given duty cycle, such as fifty percent, is to be maintained. Using the technique according to the present invention, the pulse width is held constant while the inter-pulse "dead time" alone is varied to vary the frequency of the tone. This, in turn, holds the spectral envelope of $w_p$ constant, regardless of the fundamental being generated, and it is this property of the signal which so dramatically reduces the aliasing problem heretofore experienced in discrete-time tone generation systems.

Thus, any $w_p$ spectrum which is generated is intrinsically low-pass filtered by the very nature of the waveform generation process. All harmonics that are dangerously high automatically fall within the W(Jω) sidelobe structure where they undergo severe attenuation. In the case of a fifty percent duty cycle square wave, on the other hand, it is known that only the fundamental frequency lies within the resulting "sin x/x" spectral centerlobe; all other harmonics appear within the sidelobes, and these sidelobes have relatively large peak amplitudes. In fact, the square wave derives its rich overtone structure precisely from these strong sidelobes, thus, the usage of the sidelobe structure in the present system is quite different from that in the square wave tone generation methods.

Figure 1:
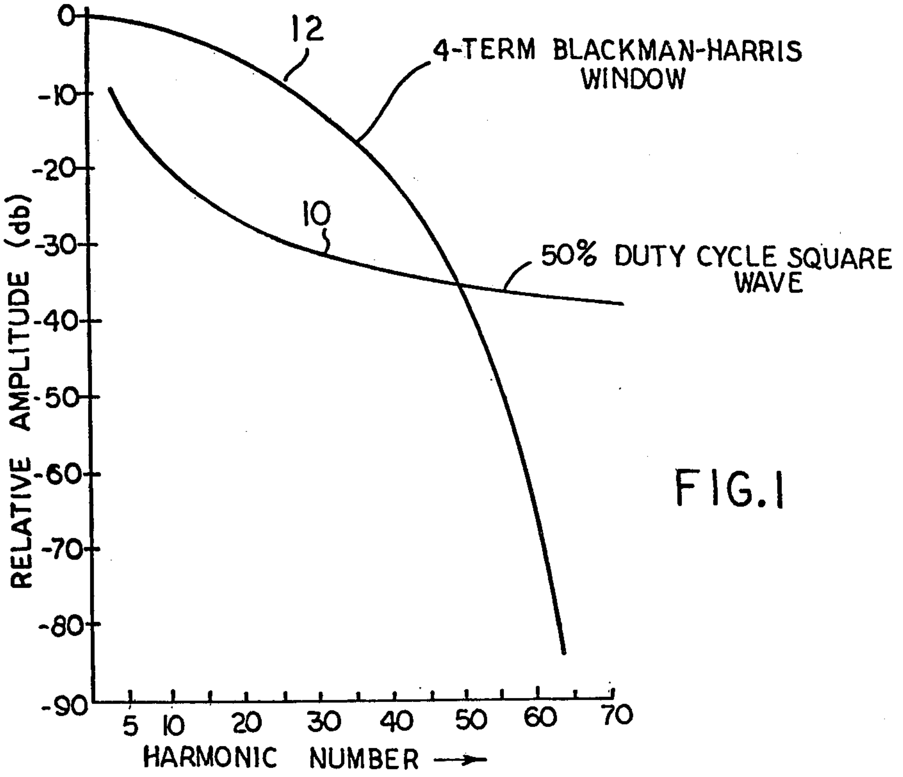
FIG. 1 is a plot of the envelope of the harmonic amplitudes of the Blackman-Harris window function as compared with a standard squarewave.

FIG. 1 is an envelope plot of relative amplitude versus harmonic number wherein curve 10 relates to a fifty percent duty cycle squarewave, and curve twelve to the four-term Blackman-Harris window. The harmonic strengths of both the squarewave and window function signals are shown for $f_o=\omega_0/2\pi=312.5$ Hz (just above "middle C"). In the squarewave case, only odd-numbered harmonics appear, of course. Those window function harmonics beyond the $64^{th}$ are in excess of 90 dB. below the fundamental's amplitude. Observe that out to the $47^{th}$ harmonic, the window signal is richer in harmonic content than is the squarewave.

In prior art digital tone generation systems, the stored waveform is scanned or addressed in a cyclic fashion wherein the rate of scanning or addressing is increased for the production of higher frequency tones and decreased for the production of lower frequency tones. Furthermore, the resultant periodic wave comprises a plurality of the stored waveforms time-concatonated so that an uninterrupted signal results. Thus, the time duration of each individual waveform period decreases with increasing frequency caused by a higher rate of scanning, and there are more such individual waveforms per unit length of time due to the fact that there is no "dead space" between the individual waveforms.

Figure 2:
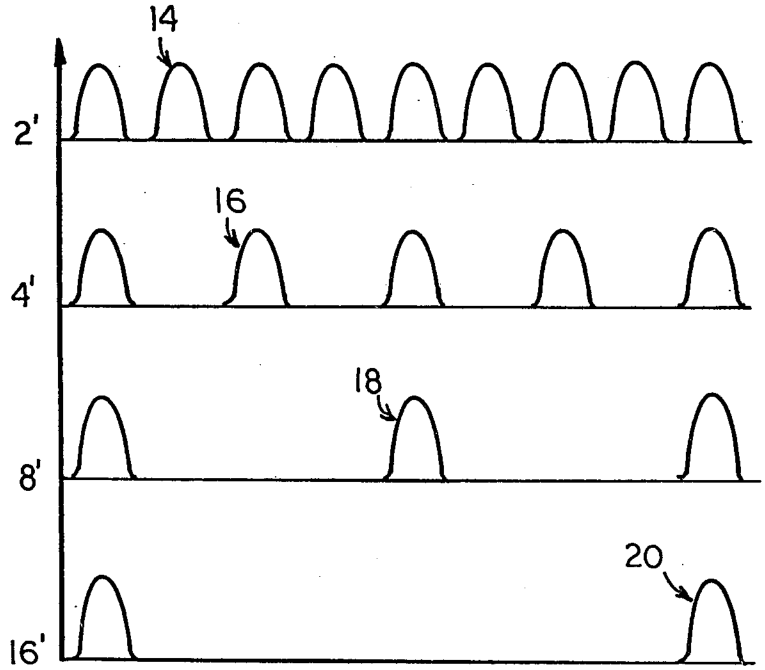
FIG. 2 is a diagram of the time relationships of the 2′, 4′, 8′ and 16′ window signals.

In the tone generation system according to the present invention, on the other hand, the stored waveform is scanned at a fixed rate regardless of fundamental frequency, and the frequency of the resultant signal is varied by varying the dead space, i.e. the time between successive waveforms, in which no signal is present. FIG. 2 illustrates the periodic window signals produced according to the present invention in the 2′, 4′, 8′ and 16′ ranges. Suppose that the 2′ version of a musical note to be generated occurs at a fundamental frequency less than $f_s/8$, wherein $f_s$ is the sampling frequency. For $f_s=40$ khz, this will be true for all keyboard notes save a portion of those lying in the highest upper manual octave. The successive window pulses will not overlap in time, but will rather be separated by zero-signal intervals. In one embodiment of the invention, the 2′ signal 14 comprises the individual window waveforms spaced as closely together as required by the 2′ fundamental frequency desired. The 4′ signal 16 is achieved by deleting or setting to zero alternate pulses within the 2′ pulse train 14 thereby producing a signal having a frequency which is half that of the 2′ signal 14 and an octave lower. The 8′ waveform 18 window pulses are separated by intervals equal to the intervals between alternate pulses in the 4′ signal 16, and the 16′ signal window pulses 20 are separated by intervals equal to the interval between alternate pulses in the 8′ signal 18. Thus, the entire spectrum of the organ can be reproduced by varying the spacing between successive window pulses from a 2′ signal on down to the lowest frequency 16′ signal which the organ is capable of playing.

The lower frequency footage signals can be generated by simply deleting alternate pulses within the signal representing the next higher frequency footage, so that the 4′ signal 16 may be derived from the 2′ signal 14, the 8′ signal 18 from the 4′ signal 16, and the 16′ signal 20 from the 8′ signal 18.

If a higher footage signal is derived in this way, or if one requires a considerably lower frequency within the same footage, then the zero-signal interval will increase in length, and the human ear will likely perceive a loudness reduction. Human loudness perception is not a fully understood phenomenon, but if we choose the simple mean-square loudness measure, then it can be shown that this measure, L, obeys the formula:

$$L=f_0(0.556\times 10^{-4}-0.515\times 10^{-8}f_0)$$

when the four-term Blackman-Harris window is used. For equal loudness perception in the 30 Hz to 5 kHz range, four extra bits of digital word overhead can be shown to be sufficient to provide the signal scaling needed.

Instead of setting alternate pulses of a higher frequency footage signal to zero in order to obtain the next lower frequency footage, the alternate pulses can be multiplied by nonzero quantities in order to obtain a different timbre. For example, if a footage wave form contains one occupied pulse slot followed by $n-1$ pulse slots set to zero within a single period, then these pulse slots could instead be multiplied by the weights $a_0, a_1, \ldots, a_{n-1}$. The new spectrum can then be written as $$W_a(j\omega) = \left[\sum_{i=0}^{n-1} a_i e^{j\omega iT_0/n}\right] W_p(j\omega)$$

Figure 3:
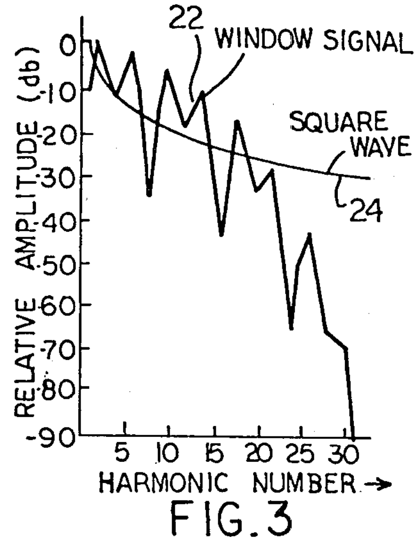
FIG. 3 is a diagram of the relative harmonic content of a 16′ voice with non-binary pulse slot weightings.

In FIG. 3, a 625 Hz, 16′ signal harmonic structure is shown in the case that

| | |
|---|---|
| $a_0 = 1.0$ | $a_4 = 0.2$ |
| $a_1 = 0.2$ | $a_5 = -0.8$ |
| $a_2 = 0.8$ | $a_6 = 0.0$ |
| $a_3 = 0.6$ | $a_7 = -0.9$ |

Here again, $f_s=40$ kHz. FIG. 3 is an envelope plot of relative amplitude versus harmonic number for the 16′ 625 Hz signal 22 compared with a square wave signal 24.

Figure 4:
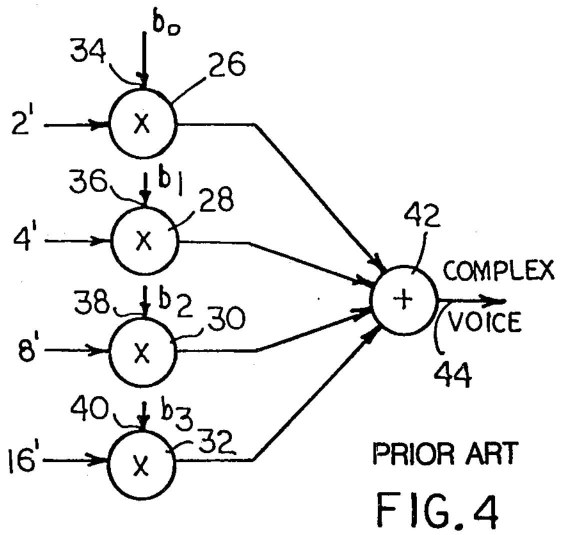
PRIOR ART FIG.4
FIG. 4 is a schematic diagram of a standard footage mixing system.

A straightforward digital implementation of the standard method of producing a complex 16′ voice is illustrated in FIG. 4. This comprises four multipliers 26, 28, 30 and 32 having as their inputs the 2′, 4′, 8′ and 16′ signals. The weighting inputs 34, 36, 38 and 40 for the b0–b3 scale factors modify the incoming signals to produce the appropriate amplitudes of the respective footages, and the outputs are summed by adder 42 to produce the complex voice on output 44. This is a linear combination of four footages that would require four digital multiplications and three additions per sample time T.

Figure 5:
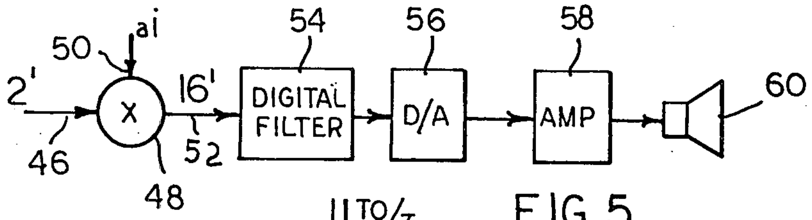
FIG. 5 is a schematic diagram of a system to produce complex harmonic structures prior to formant filtering in accordance with the present invention.

With reference to FIG. 5, however, it can be shown that the $a_i$ weighting of a single footage described above can produce the same voice magnitude spectra as the more common technique illustrated in FIG. 4. In this case, the 2′ input on line 46 to multiplier 48 is multiplied by the $a_i$ factors on input 50 to produce the complex 16′ voice on input line 52. It should be noted that the approach illustrated in FIG. 5 requires only one multiplication per sample time and no additions. The digital output on line 52, which is typically a very complex waveform having the appropriate harmonic structure, is filtered by digital filter 54 to emphasize the formants appropriate to the particular musical instrument which is being simulated. The output of filter 54 is connected to the input of digital to analog converter 56, which converts the signal to analog form, and this is amplified by amplifier 58 and reproduced acoustically by speaker 60. The acoustic tone reproduced by speaker 60 may be a typical organic voice, the harmonic structure of which is developed by multiplier 48 having as its inputs the weightings on input line 50 and the periodic repetition of window functions on input line 46, and wherein the formant emphasis is achieved by filter 54.

To obtain interesting timbre evolutions, the $a_i$ weighting factors may be allowed to vary slowly with time according to, for example, a piecewise linear curve. This would provide the ability to change a large part of the harmonic structure during the attack, sustain, and decay portions of a note and would aid greatly in the psycho-acoustic identification of an instrument. The $a_i$ multipliers may also be relied on to handle, not only the spectral evolution, but also the amplitude enveloping of a note. This places the keying operation at the voicing stage of the note generation process, which is, in many cases, desirable.

Figure 6:
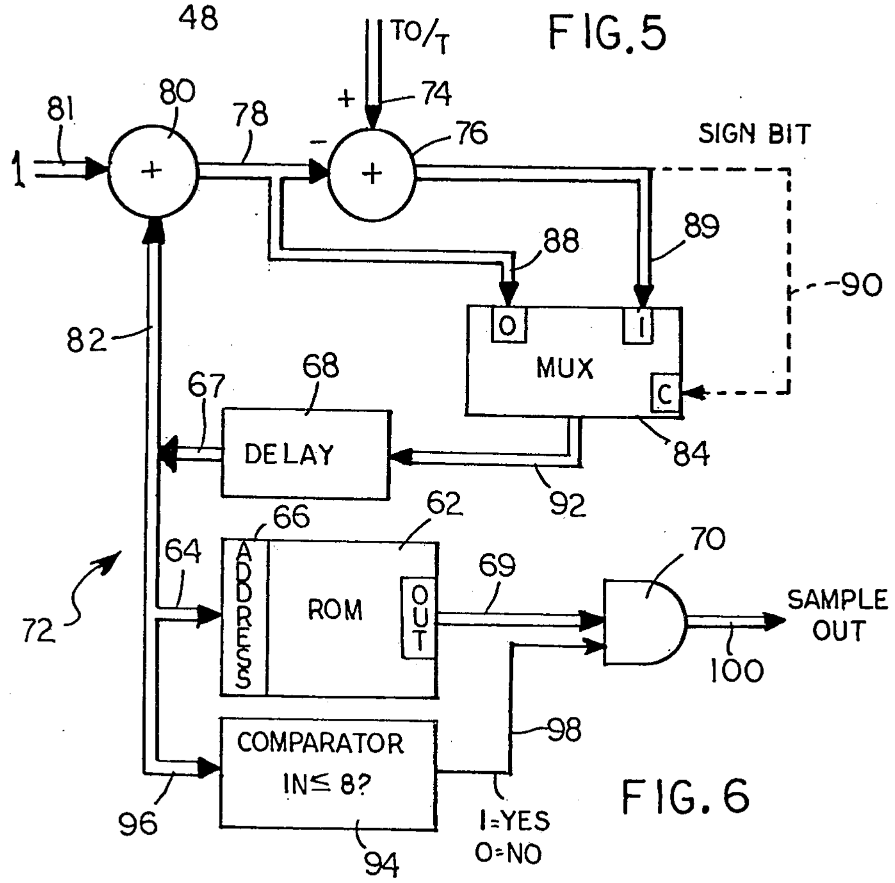
FIG. 6 is a schematic diagram of an oscillator for generating the periodic window function.

An example of the hardware required to generate the periodic four-term Blackman-Harris window function signals is illustrated in FIG. 6. The window function being utilized is stored in read only memory 62, and the input 64 to the address portion 66 of read only memory 62 is connected to the output 67 of delay circuit 68. The output 69 of read only memory 62 is connected to one of the inputs of AND gate 70.

The period of the desired signal, in units of $T=1/f_s$, is the only input required by the oscillator 72 of FIG. 6. This input on line 74 to subtractor 76 is equal to the period $T_0$ of a single window function (including dead time) divided by the period of a single sample time T, and this quantity equals the number of samples per window function waveform. As an example, the window function minus dead time may equal eight samples per waveform generated. The other input to subtractor 76 is the output 78 from adder 80, which has as one of its inputs 81 the integer value 1, and as its other input 82 the output from delay circuit 68 in the feedback loop comprising adder 80, subtractor 76, multiplexer 84 and delay circuit 68.

Thus, subtractor 76 subtracts from the number of samples for an entire single period (including dead time) a recirculating data stream that is being incremented by the integer 1 for each cycle through the feedback loop. Multiplexer 84 has as its first input 88 the output from adder 80, which is the recirculated data stream being incremented by one each cycle, and as its second input 89 the output from subtractor 76, which is the difference between the total number of sample times per period and the number being recirculated and incremented in the feedback loop. When the control input 90 of multiplexer 84 detects a change in sign, which indicates that the entire period has been completely counted through, multiplexer 84 no longer passes to its output 90 to the incrementing count on the input 88, but, instead, passes the output from subtractor 76, thereby permitting the counting sequence to be again initiated.

The input 64 to the address portion 66 of read only memory 62 addresses a sequence of sample points within read only memory 62 to produce on output 69 of samples of the four-term Blackman-Harris window function. Since outputs are desired only during the time period for which the window function is to be produced, and since, in this particular case, the time period comprises eight samples, it is necessary to disable gate 70 at all times other than those during which the window function is to be sampled. This is accomplished by comparator 94, which has its input 96 connected to the output of the feedback loop, and its output 98 connected to the other input of AND gate 70. Comparator 94 compares the value on input 96 with the integer 8, and when this value is less than or equal to 8, it enables AND gate 70 by producing on output 98 a logic 1. At all other times, the value on the input 96 will be greater than 8, and comparator 94 will disable AND gate 70. The output 100 from AND gate 70 carries the sampled four-term Blackman-Harris window function followed by a zero-signal interval of appropriate duration, and this would be connected to the input of multiplier 48 (FIG. 5), for example, As discussed earlier, the multiplication technique can be used to produce complex voices having the appropriate harmonic content.

If the fundamental frequencies to be generated can exceed the "overlap" limit $f_s/8$, there are several methods one can use to raise this limit. Conceptually the simplest is to produce two periodic signals of frequency $f_o/2$ that are 180° out of phase. The sum of these two signals will be a 2' signal with a fundamental frequency limit of $f_s/4$. Either of these two signals separately yields a 4' version of $f_o$.

A 16-bit representation for $T_o/T$ turns out to be a good choice: Eleven bits of the integer portion and five bits reserved for the fractional part. This sets a low fundamental frequency limit of about 19.5 Hz. Also, the frequency ratio of two successive fundamental frequencies is 1.000015625 at 20 Hz and 1.00390625 at 5 kHz.

A general formula for the ratio of two successive fundamental frequencies using the window method is $$\frac{f_{n+1}}{f_n} = 1 + 2^{-n}\frac{f_{n+k}}{f_s}$$

where n is the number of fractional bits in $T_o/T$. The usual technique for waveform lookup in ROM tables prescribes a constant phase increment which augments an accumulator (every T seconds) whose contents serve as a ROM address. If the number of accumulator bits is m, then the ratio of two successive fundamental frequencies achievable by the "usual" method is $$\frac{f_{n+1}}{f_n} = 1 + 2^{-m}\frac{f_s}{f_n}$$

Note that the window approach exhibits an increasing ratio as $F_{n+1}$ (or $f_n$) increases, while the standard technique displays a decreasing ratio. Since the human ear appears to be sensitive to percentage changes in pitch, we see that the new method places more accuracy than is needed at the lower frequencies, while the well-known approach establishes excess accuracy at the higher fundamentals. An ideal digital oscillator would hold this ratio constant.

Figure 8:
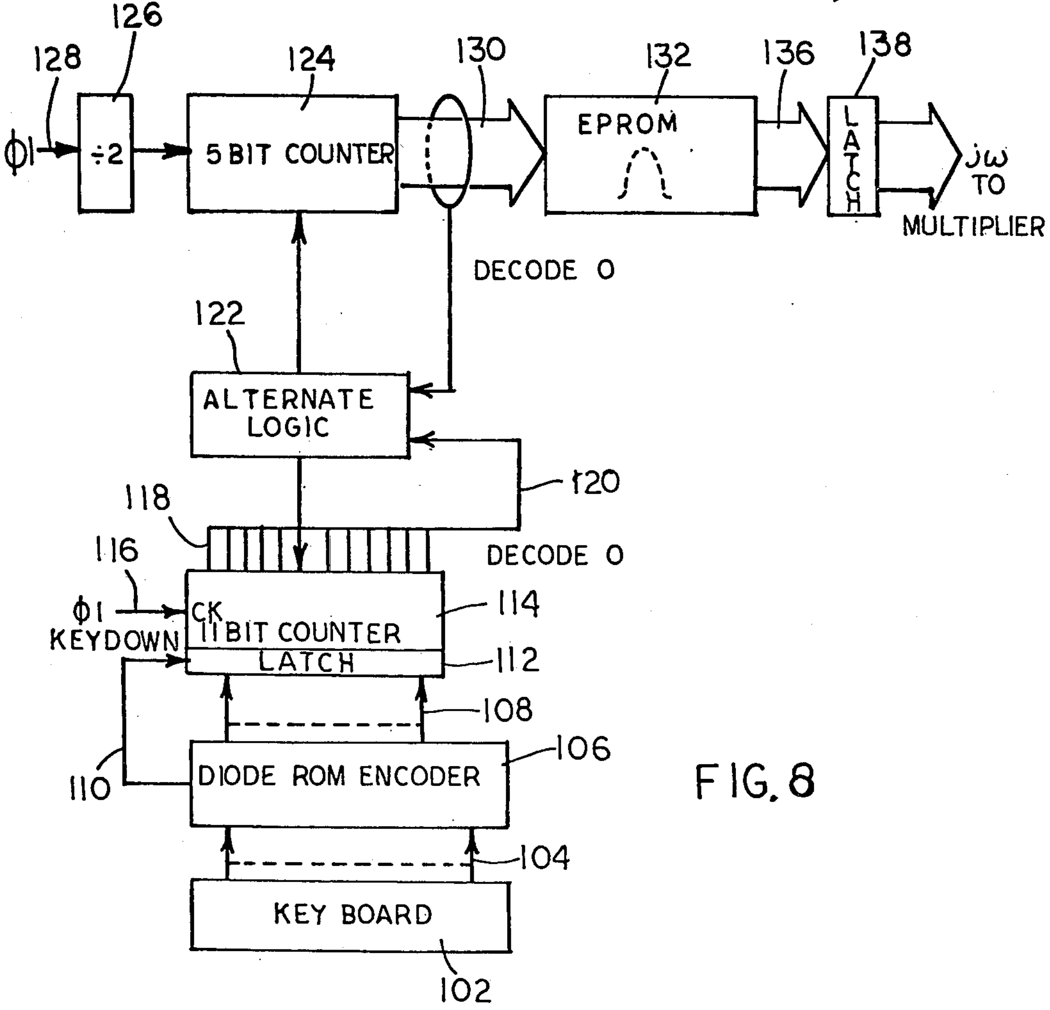
FIG. 8 is a schematic diagram of an alternative system for generating the periodic window function.

FIG. 8 illustrates an alternative system for producing the window pulses. Keyboard 102 has the outputs 104 of the respective keyswitches connected to the inputs of a diode read only memory encoder 106. Encoder 106 produces on its outputs 108 a digital word representative of the period $T_0$ for the particular key of keyboard 102 which is depressed. A keydown signal is placed on line 110, and this causes latch 112 to latch the digital word on inputs 108 into eleven bit counter 114. Counter 114, which is clocked by the phase 1 signal on line 116, counts down from the number loaded into it from latch 112, and the output 118 thereof are decoded to produce a decode 0 signal on line 120, which is connected to alternate logic circuit 112.

Five bit counter 124 is clocked by the output of divide-by-two divider 126, which is fed by the phase 1 clock signal on line 128. Counter 124 produces a series of five bit binary words on outputs 130, which address a 2704 electronically programmable read only memory 132, in which is stored the thirty-two samples of the four-term Blackman-Harris window function. By choosing a sampling comprising thirty-two points, a five bit binary address word can be utilized.

Alternate logic block 122 has at its input the decode 0 signal on line 120 and causes five bit counter 124 and eleven bit counter 114 to operate in opposite time frames. During the time that elevel bit counter 114 is counting down to 0 from the number set into it by encoder 106, five bit counter 124 is disabled so that no addressing of memory 132 is occurring. When counter 114 has counted completely down to 0, which signals the end of the dead time between successive window pulses, alternate logic block 122 detects the corresponding signal on line 120, and activates five bit counter 124 to count through the thirty-two bit sequence. At this time, eleven bit counter 114 is disabled.

As memory 132 is addressed, it produces on outputs 136 the digital numbers representative of the respective samples of the window function. Digital numbers 136 are latched in latch 138, which latches the digital representations of the samples to the scaling factor multiplier 48 (FIG. 5). Latch 138 is actuated at the appropriate time in the sequence, when the multiplier 48 is in an accessible state.

The tone generation system described above solves the problem of aliasing, which is so prevalent in discrete-time tone generating systems. It accomplishes this by utilizing the four-term Blackman-Harris window function, which has a fixed time width, and varies the spacing between successive window function waveforms to produce output signals of varying frequency.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An electronic musical instrument comprising: player actuated tone frequency selection means, memory means for storing one cycle of a fixed width window function waveform, means responsive to the actuation of the tone selection means for reading said waveform out of said memory at a fixed rate for each cycle thereof independent of the frequency selected and in a repetitive fashion to produce a continuous signal wherein the period of dead time between each successive reading of a cycle of the waveform is selectively adjusted in response to the frequency selected by the tone selection means without changing the width of the read out waveform to thereby produce a continuous train of time sequential said window function waveforms having a frequency inversely inversely proportional to the period of dead time between the commencement of each successive reading, and means responsive to the train of read out waveforms for producing an audible musical tone.

2. The electronic musical instrument of claim 1 wherein said waveform is stored as a plurality of digitally encoded amplitude samples.

3. The electronic musical instrument of claim 1 wherein: said waveform is stored in said memory in the form of a plurality of amplitude samples, said means for reading includes means for sampling in succession the plurality of said amplitude samples at a given sampling frequency, and said waveform train has a limited bandwidth wherein nearly all of the energy of the waveform train occurs at frequencies lower than one half of the sampling frequency.

4. The electronic musical instrument of claim 3 wherein the window function is the four-term Blackman-Harris window function.

5. The electronic musical instrument of claim 3 wherein said waveform is a window function having a frequency spectrum with a centerlobe and at least one pair of sidelobes, wherein the sidelobe amplitude peaks are at least 92 db below the amplitude peak of the centerlobe.

6. The electronic music instrument of claim 1 wherein said waveform train comprises a plurality of said window function waveforms separated from each other by time intervals in which a zero signal level is present and said time intervals are equal to the period of time between the successive operable readings of the stored waveform.

7. The electronic musical instrument of claim 6 wherein the waveforms read out of said memory means form a cyclically recurring series of a predetermined fixed number of said waveforms, and including means for controlling the harmonic content of the waveform train read out of said memory means comprising means for adjusting independently of each other the respective amplitudes of the waveforms in each occurrence of said series.

8. The electronic musical instrument of claim 1 wherein a single cycle of a given footage comprises a series of said window function waveforms read out of said memory means separated from each other by dead spaces in which a zero level signal is present and said dead spaces are equal to the period of time between the successive operable readings of the stored waveform, and including means for controlling the harmonic content of the waveform train comprising means for adjusting independently of each other the respective amplitudes of the waveforms in each occurrence of the series.

9. The electronic musical instrument of claim 1 wherein the stored waveform is the four-term Blackman-Harris window function.

10. An electronic musical instrument comprising: a keyboard comprising a plurality of playing keys assigned to different tone frequencies, memory means for storing one cycle of a window function waveform, means responsive to the actuation of any key of the keyboard for reading said waveform out of said memory at a fixed rate for each read out cycle thereof to produce a read out waveform of a predetermined constant width and in a repetitive fashion to produce a continuous train of said window functions separated by dead spaces as long as said any one key is held actuated and for adjusting the period of time between the beginning of each reading of the waveform and the beginning of the next reading thereof in the continuous signal in response to the tone frequency of the actuated key without changing the width of the read out waveform from said predetermined constant width, and means responsive to the read out window function waveforms for producing an audible musical tone.

11. The electronic musical instrument of claim 10 wherein said waveform is stored as a plurality of digitally encoded amplitude samples.

12. The electronic musical instrument of claim 10 wherein: said waveform is stored in said memory in the form of a plurality of amplitude samples, said means for reading includes means for sampling in succession a plurality of said amplitude samples at a given sampling frequency, and said waveform train has a limited band width wherein nearly all of the energy of the waveform train occurs at frequencies lower than one-half of the sampling frequency.

13. The electronic musical instrument of claim 12 wherein the window function is the four-term Blackman-Harris window function.

14. The electronic musical instrument of claim 10 wherein a single cycle of a given footage comprises a series of said window function waveforms read out of said memory means separated from each other by dead spaces in which a zero level signal is present and said dead spaces are equal to the period of time between the successive operable readings of the stored waveform, and including means for controlling the harmonic content of the waveform train comprising means for adjusting independently of each other the respective amplitudes of the waveforms in each occurrence of the series.

15. The method of generating a plurality of musical tones of differing frequency comprising:

providing a memory in which one cycle of a fixed duration window function waveform is stored, actuating a tone frequency selection device to select a tone of a predetermined selective frequency and reading the stored waveform out of the memory at a fixed rate for each cycle thereof independent of the frequency selected and in a repetitive fashion to produce a continuous signal of the selected frequency, changing the tone selected by the tone frequency selection device, and in response to the changing of the tone frequency selected, selectively adjusting the period of dead time between each successive reading of the cycle of the waveform in response to the frequency selected by the tone frequency selection device without changing the width of the read out waveform to thereby produce a continuous train of time sequential said window functions having a frequency inversely proportional to the period of dead time between the commencement of each successive reading.

16. The method of claim 15 wherein the stored waveform is the four-term Blackman-Harris window function.

* * * * *

UNITED STATES PATENT AND TRADEMARK OFFICE

CERTIFICATE OF CORRECTION

PATENT NO. : 4,446,770

DATED : May 8, 1984

INVENTOR(S) : Steven C. Bass

It is certified that error appears in the above-identified patent and that said Letters Patent is hereby corrected as shown below:

Col. 1, line 38, after "last" insert --step--;
line 49, delete "will" after "waves";
line 53, changes "values" to -- value --
Col. 3, line 44, change "$(T_o 8T)/T$" to --$(T_o-8T)/T$--
Col. 6, line 14, change "input" to --output--;
line 27, change "organic" to --organ--.
Col. 7, line 17, delete "of";
line 38, change "example," to --example.--.
Col. 8, line 26, change "output" to --outputs--;
line 28, change "112" to --122--;
line 41, change "elevel" to --eleven--.
Claim 1, Col. 9, line 22, delete "inversely", second occurrence.
Claim 6, Col. 9, line 48, change "music" to --musical--.

Signed and Sealed this

*Twenty-sixth* Day of *March 1985*

[SEAL]

*Attest:*

DONALD J. QUIGG

*Attesting Officer*

*Acting Commissioner of Patents and Trademarks*